Jan. 7, 1964   B. GRABOVAC   3,116,634
TORQUE METER
Filed Nov. 21, 1960
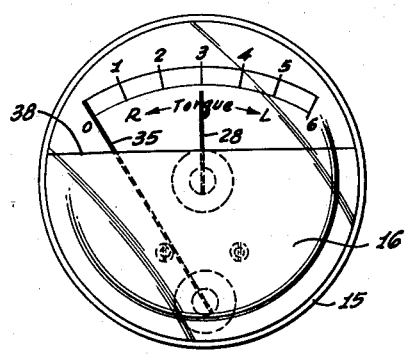
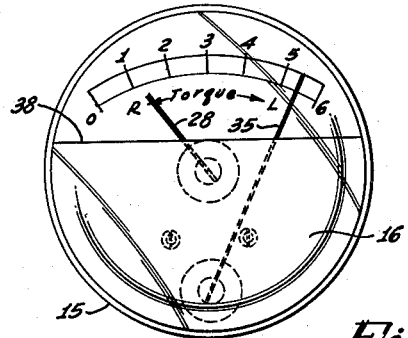
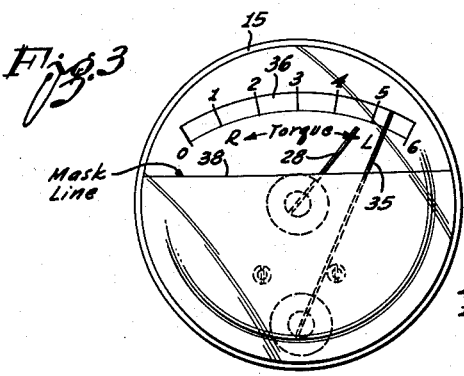
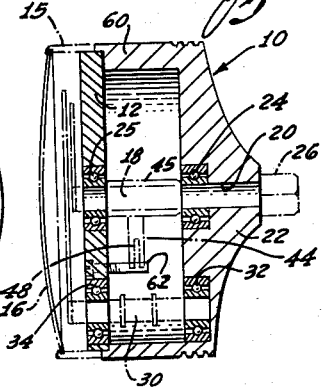
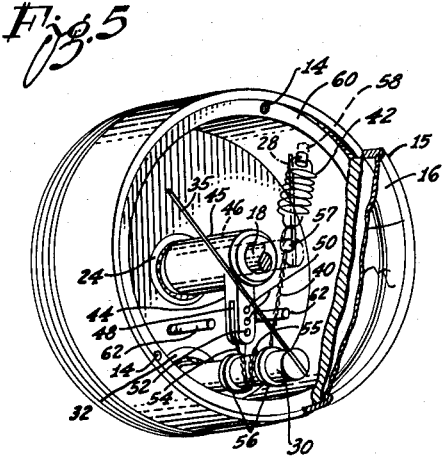
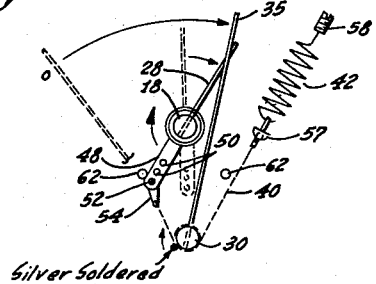
INVENTOR
Bosko Grabovac
By Smyth, Roston & Pavitt
Attorneys.

United States Patent Office 3,116,634
Patented Jan. 7, 1964

3,116,634
TORQUE METER
Bosko Grabovac, Altadena, Calif., assignor to Torque Controls, Inc., San Gabriel, Calif., a corporation of California
Filed Nov. 21, 1960, Ser. No. 70,839
12 Claims. (Cl. 73—134)

This invention relates to an instrument for measuring torque forces and, more particularly, relates to a direct-reading torque meter small enough in size to be held in one hand for carrying out a torque measuring procedure.

There is widespread need for torque meters to measure relatively large forces in inch-pounds, or smaller torque forces in inch-ounces, or still smaller forces in centimeter-grams. Many occasions arise where it is necessary to ascertain the torque developed by motors, such as servo-motors, over ranges of power input. There are also numerous situations where the torque required for a control function must be checked, such as the torque required to operate a control vane on a guided missile. To give another example, in some situations the torque to be measured is the frictional resistance of a transmission means such as a gear train.

In too many instances, the torque magnitudes are derived by computations based on limited data at the expenditure of excessive time and effort and with the risk of error that is inherent in such calculations. Prony brake tests are used on occasion but such tests are time consuming and subject to errors. It is apparent that there is a basic need for some simple but reliable, accurate direct-reading torque meter that is operable equally well in both rotary directions.

One type of direct-reading torque meter heretofore described uses a spiral torsion spring. Such a torque meter, however, can measure torque in only one rotary direction.

Another type of direct-reading torque meter of the prior art comprises essentially a torsion bar. A torsion bar may be used to measure torques in opposite rotary directions but has a certain disadvantage if each of the two opposite torque ranges is to start at a minimum torque reading of substantial magnitude. If the torque bar is pre-loaded to the minimum torque value, the pre-loading must be reversed when the direction of response of the torque bar is reversed and the result is a rotational gap between the minimum torque value in one direction and the same minimum torque value in the opposite direction. Consequently, the scales for the two opposite torque ranges instead of being continuous must be spaced apart by a substantial arc. The result is not only an awkward scale arrangement but also substantial reduction of the circumferential direction that is available for measurements in the two opposite ranges.

The present invention avoids the above disadvantages and meets the aforementioned basic need by connecting a flexible means in the form of a fine chain to an eccentric point on a rotary torque input means and by using yielding means, such as a coiled tension spring, to place the chain under yielding tension. The tensioned chain urges the input means to a normal rotary position at which the chain extends along a radius from the axis of rotation of the input means. An applied torque force rotates the input means in either of two opposite directions from its normal position against progressively increasing resistance by the spring. The magnitude of the torque is measured by measuring the travel of the chain.

In the present practice of the invention, the chain engages and rotates a rotary idler and for this purpose may be wound at least partially around the rotary idler. The rotation of the idler measures the longitudinal movement of the chain and thus measures the magnitude of a torque that is applied to the rotary input means. A pointer extending radially from the idler traverses a suitable arcuate scale that is calibrated in suitable torque units.

There are several important advantages in such an arrangement. In the first place, the spring may be a simple coiled tension spring. In the second place, the tension spring may be anchored to an adjustment screw for varying the normal tension of the spring.

In the third place, any desired ratio may be provided between the rotation of the idler and the rotation of the input means. Usually it is desirable to have the torque pointer sweep over a substantial area in response to only a few degrees of rotation of the torque input means. The sweep of the pointer for a given increment of rotation of the input means may be increased by increasing the radial distance from the axis of the input means to the point of attachment of the chain to increase the length of the arc traversed by the point of attachment. The sweep of the pointer may also be increased by decreasing the diameter of the rotary idler to obtain more rotation in response to a given amount of travel by the chain.

There is a further advantage in the described arrangement if the torque meter is to be in the desirable form of a circular device small enough to be held in one hand for carrying out a torque measurement. This advantage is that the rotary input means may be at the center of the circular device with the rotary idler located eccentrically near the circumference of the circular device. The eccentric location of the idler makes it possible to employ a pointer on the idler that is relatively long, to traverse a relatively long arc and thus permit the use of a relatively long arcuate scale of torque values.

A further and outstanding advantage of the described arrangement is that it measures torques in both rotary directions with equal facility and does so with a single scale. Where a limited area is available for scale use, a single scale covering a given range of values for both rotary directions can be twice as long as two scales for the same range of values in the two respective rotary directions. The use of a single scale, moreover, avoids the previously mentioned wasted gap between two scales when pre-loading is required to start the range of scale values at a magnitude substantially above zero.

A feature of the invention is the further concept of providing a second indicating means to indicate the direction that the input means rotates, thereby to indicate the rotary direction of the applied torque force. For this purpose, a second pointer is mounted on the rotary input means to swing in opposite directions from a neutral position.

In the drawing, which is to be regarded as merely illustrative:

FIG. 1 is a face view of a selected embodiment of the invention showing the positions of the two pointers in the absence of an applied torque;

FIG. 2 is a similar view showing the positions of the two pointers in response to either a rightward rotation of the meter to transmit a torque to some device or a corresponding reaction of the meter to an applied torque force;

FIG. 3 is a similar face view with the two pointers indicating a torque in the opposite rotary direction;

FIG. 4 is an axial section of the casing or housing of the torque meter with some of the parts shown in phantom;

FIG. 5 is a front perspective view of the torque meter with portions of the structure removed to reveal concealed parts; and FIG. 6 is a simplified diagrammatic view of the working parts of the torque meter.

As shown in FIGS. 4 and 5, the working parts of the selected embodiment of the invention are enclosed by a housing or casing comprising a cup-shaped body 10 that is closed by a disk 12, the disk being secured by suitable screws 14. Mounted on the disk 12 and extending forward therefrom is a short cylindrical member or ring 15 in which is mounted a window in the form of a dished, transparent plate 16 of suitable transparent material such as glass or plastic.

A rotary torque input member in the form of a first shaft 18 is mounted concentrically in the instrument housing. As shown in FIG. 4, the shaft 18 extends through an axial bore 20 in the back wall 22 of the housing and is journaled in a ball bearing 24 in the back wall as well as in a forward ball bearing 25 in the disk 12. The rear end of the shaft 18 protrudes from the rear of the housing and is formed with an enlargement 26 of square cross section to permit the shaft to be coupled to a device for measuring torque.

The forward end of the input shaft 18 is provided with a relatively short pointer 28 which is normally at a central neutral position as shown in FIG. 1 and is movable from that position in either direction to indicate the direction of rotation of the input shaft. The two arrows in FIG. 1 indicate the opposite directions of movement from the neutral position, and the letter R beyond the left arrow indicates the direction of the reaction movement of the input shaft when the instrument is connected to a device and is rotated to the right to apply a torque to the device. In like manner, the letter L indicates the direction of reaction rotation of the input shaft when the instrument is rotated leftward to apply a torque to some device that is under test.

A rotary idler in the form of a second shaft 30 is journaled in a ball bearing 32 in the back wall 22 of the housing and is journaled in a forward ball bearing 34 in the disk 12. The forward end of the second shaft 30 carries a relatively long pointer 35 which traverses an arcuate scale 36 that is calibrated in suitable torque values, such as inch-pounds, inch-ounces, or centimeter-grams. It will be noted that the positioning of the second idler shaft 30 at an eccentric position near the circumference of the instrument makes it possible to use a pointer 35 that is of relatively great length.

Preferably, the front of the instrument is provided with a mask 38 that conceals the major portion of the disk 12, only the swinging ends of the two pointers 28 and 35 being visible. The mask 38 may comprise simply a coating of opaque material on the window 16.

The input shaft 18 operates the idler shaft 30 by means of a fine chain 40 and a cooperating coiled tension spring 42. For this purpose the input shaft 18 is provided with a torque arm 44 that is suitably connected to the chain. In the construction shown, the torque arm 44 is integral with a sleeve 45 that embraces the input shaft 18 and is secured thereon by a setscrew 46.

It is contemplated that suitable provision will be made adjusting the effective length of the torque arm 44, i.e., the radial distance of the point of attachment of the chain 40 from the axis of rotation of the input shaft 18. In the construction shown, the torque arm 44 is formed with a long slot 48 to receive the end of the chain 40, and the torque arm has a series of bores 50 at different radial distances from the axis of rotation to receive selectively a cross pin 52 for privotally connecting the chain to the torque arm. Thus the effective length of the torque arm may be adjusted simply by shifting the pin 52 from one bore to another. The end of the chain 40 is provided with a suitable connecting member 54 for engagement by the cross pin 52.

In this particular embodiment of the invention, the chain 40 is wrapped around the second idler shaft 30 to make nearly two complete turns. The chain makes positive engagement with the idler shaft 30 to prevent slippage relative to the axial shaft, and for this purpose one point of the chain may be directly bonded to the idler shaft, for example, by silver solder as indicated at 55. Preferably, the idler shaft 30 is formed with a pair of spaced radial flanges 56 to confine the turns of the chain.

The second end of the chain 40 is connected by a suitable swivel fitting 57 to one end of the tension spring 42. The second end of the tension spring 42 is connected to an adjustment means in the form of a setscrew 58 that is mounted in the cylindrical wall 60 of the housing. In the construction shown, the end of the spring hooks through a diametrical bore in the setscrew. The setscrew 58 may be rotated for the purpose of calibrating the instrument, the swivel fitting 56 keeping the rotation of the screw from being transmitted to the chain 40 thereby keeping the chain from becoming twisted.

The setscrew is threaded into a bore that extends all the way through the circumferential wall of the instrument housing but the outer end of the setscrew terminates short of the outer end of the bore so that the bore may be potted with a suitable sealing material once the instrument is calibrated. It is contemplated, however, that the potting material will be readily removable to make it possible to recalibrate the instrument if the spring weakens slightly with fatigue over a long service period.

Preferably, some provision is made to limit the range of movement of the described mechanism to prevent damage to the parts. For this purpose a pair of stop screws 62 may be mounted in the disk 12 in positions to stop the torque arm 44 when the long pointer 35 reaches the two ends of the scale 36.

The manner in which the instrument serves its purpose may be readily understood from the foregoing description. By way of example, let it be assumed that the input shaft of the instrument is connected to a gear train to ascertain the amount of torque force that is required to overcome the friction in the gear train. With the input shaft connected to the gear train, the instrument may be rotated manually to the right until the gear train yields. The long pointer 35 will move rightward along the scale 36 to a point corresponding to the magnitude of the applied torque force and at the same time the short pointer 28 will swing leftward, as shown in FIG. 2, to indicate the direction of the torque that is applied to the gear train. To ascertain the torque necessary to operate the gear train in the opposite direction, the instrument is rotated in the opposite or leftward direction to obtain the desired torque force reading and the short pointer 28 swings toward the letter L, as shown in FIG. 3, to indicate the rotary direction of the torque that is applied to the gear train.

It is apparent that the magnitude of the swinging movement of the long pointer 35 for a given amount of rotation of the input shaft 18 is determined by the effective length of the torque arm 44 together with the diameter of the idler shaft 30. Thus, the magnitude of the swinging movement of the long pointer 35 may be increased by increasing the effective length of the torque arm and decreasing the diameter of the idler shaft.

The range of torque values represented by the swinging movement of the long pointer 35 is determined primarily by the rate of the spring. It is usually desirable to have the long pointer swing over the full length of the scale 36 in response to a relatively short arc of rotation of the instrument. It is for this reason that a relatively long torque arm is employed.

The spring rate may be chosen to measure relatively heavy torque forces in terms of inch-pounds, or lighter forces in term of inch-ounces, or still smaller forces in terms of centimetergrams. The spring 42 may be preloaded to any desired magnitude by the adjustment screw 58.

My description in specific detail of the selected embodiment of the invention will suggest various changes, substitutions and other departures from my disclosure, within the spirit and scope of the appended claims.

I claim:

1. In a torque meter, the combination of:
   rotary input means rotatable in each of two opposite directions on a particular axis in accordance with the direction and magnitude of a torque to be measured;
   elongated flexible means attached at one end to the rotary input means at a particular point spaced radially on the rotary input means from the particular axis of rotation of the rotary input means;
   second rotary means positioned radially outwardly from the input means and in engagement with the flexible means to receive a rotation in accordance with the movement applied by the rotary input means to the enlongated flexible means;
   yielding means operatively coupled to a second end of the elongated flexible means to place the flexible means under yielding tension for urging the rotary input means to a normal position at which the particular point and the outwardly extending flexible means both lie along a common radius from the particular axis to the second rotary means whereby the yielding means yieldingly resists rotation of the rotary input means in either direction from the normal position; and
   indicating means operatively coupled to the second rotary means and responsive to the movement of the second rotary means to provide an output indication of the torque applied to the rotary input means.

2. A combination as set forth in claim 1 which includes means operatively coupled to said rotary input means and responsive to rotation of said rotary input means to indicate the direction of the torque applied to said rotary input means.

3. A combination as set forth in claim 1 wherein adjustment means are provided, said yielding means is anchored to said adjustment means and in which the adjustment means are adjustable for varying the tension of said elongated flexible means.

4. A combination as set forth in claim 3 wherein means are operatively coupled to one end of the yielding means to inhibit twisting of the flexible means, and means to vary the radial distance to said point of attachment of the elongated flexible means from the particular axis of the rotary input means to vary the magnitude of the movement of the flexible means in response to a particular magnitude of rotation of the input means.

5. In a torque meter, the combination of: rotary input means to receive a torque that is to be measured; a rotary idler; yielding means; elongated flexible means having an intermediate portion engaging said idler for rotation thereof, one end of said flexible means being connected to said rotary input means at an eccentric point thereof, the other end of the flexible means being connected to said yielding means to place the flexible means under tension thereby to urge said input means and said idler toward normal rotary positions at which said flexible means extends along a radius from the axis of the input means to the idler; and indicating means responsive to rotation of said idler in either direction from its normal position in opposition to said yielding means.

6. A combination as set forth in claim 5 in which said indicating means comprises a pointer carried by said rotary idler.

7. A combination as set forth in claim 5 which includes means responsive to rotation of said input means to indicate the direction of rotation of the input means from its normal position.

8. In a torque meter, the combination of: a rotary input means to receive a torque that is to be measured; a rotary idler; an anchored yielding means; a chain connected at one end of said yielding means to be tensioned thereby and connected at its other end to an eccentric point on said rotary input means, an intermediate portion of said chain being at least partially wrapped around said idler and engaged therewith to prevent slippage relative thereto, whereby the tensioned chain urges said rotary input means and said rotary idler toward normal positions at which said eccentric point is on a radius extending from the axis of the input means toward the rotary idler; and means responsive to the rotation of the idler to indicate the magnitude of the torque that is applied to said input means.

9. In a torque meter, the combination of: a first input shaft to receive a torque that is to be measured; a second idler shaft to measure the magnitude of the torque force; a chain having an intermediate portion engaged with said idler shaft to cause rotation thereof, one end of said chain being attached to said input shaft at an eccentric point thereof; yielding means connected to the other end of the said chain to place the chain under tension, thereby to urge said two shafts toward normal positions at which said eccentric point is on a radius from said first shaft toward said second shaft; a scale representing magnitudes of torque; and a pointer on said second shaft to traverse said scale.

10. A combination as set forth in claim 9 which includes a pointer on said first shaft to indicate the direction of rotation of the first shaft in response to a torque force applied thereto.

11. In a torque meter, the combination of: a rotary input means to receive a torque that is to be measured; an arm extending radially outward from said input means; a rotary idler; an anchored spring; flexible means connected at one end to said arm and connected at the other end to said spring to be tensioned by the spring, an intermediate portion of said flexible means being in engagement with the periphery of said idler for rotation thereof, whereby the tensioned flexible means urges said rotary input means and said rotary idler toward normal positions at which said flexible means extends radially of the input means toward the rotary idler; a pointer carried by the idler to indicate the magnitude of the torque that is applied to the input means; and a pair of spaced stop means to block the movement of said arm when said pointer reaches predetermined alternate limit positions.

12. In a torque meter, the combination of: a rotary input means to receive a torque that is to be measured; an arm extending radially outward from said input means; a rotary idler; an anchored spring; flexible means connected at one end to said arm and connected at the other end to said spring to be tensioned by the spring, an intermediate portion of said flexible means being in engagement with the periphery of said idler for rotation thereof, whereby the tensioned flexible means urges said rotary input means and said rotary idler toward normal positions at which said flexible means extends radially of the input means toward the rotary idler; a pointer carried by the idler to indicate the magnitude of the torque that is applied to the input means; and means to vary the point of connection of said flexible means with said arm to vary the radial distance of the point of attachment from the axis of the input means thereby to vary the magnitude of the movement of the flexible means in response to a given magnitude of rotation of the input means.

References Cited in the file of this patent

UNITED STATES PATENTS

| | | |
|---|---|---|
| 2,641,925 | Altman | June 16, 1953 |
| 2,977,801 | Dean | Apr. 4, 1961 |
| 3,057,194 | Waters et al. | Oct. 9, 1962 |

OTHER REFERENCES

"New Torque Watch Gauges," Bulletin published by Waters Inc., 1956.